United States Patent [19]
Oda et al.

[11] Patent Number: 5,514,935
[45] Date of Patent: May 7, 1996

[54] LIGHTING CIRCUIT FOR VEHICULAR DISCHARGE LAMP

[75] Inventors: Goichi Oda; Masayasu Yamashita, both of Shimizu, Japan

[73] Assignee: Koito Manufacturing Co., Ltd., Tokyo, Japan

[21] Appl. No.: 177,374

[22] Filed: Jan. 5, 1994

[30] Foreign Application Priority Data

| Jan. 7, 1993 | [JP] | Japan | ................................. 5-017116 |
| Jul. 16, 1993 | [JP] | Japan | ................................. 5-197626 |

[51] Int. Cl.⁶ .................................................. H05B 37/02
[52] U.S. Cl. ...................... 315/82; 315/308; 315/DIG. 7; 315/DIG. 5
[58] Field of Search ................ 315/209 R, 307, 315/308, 82, DIG. 7, DIG. 5

[56] References Cited

U.S. PATENT DOCUMENTS

| 4,240,009 | 12/1980 | Paul | 315/224 |
| 4,388,563 | 6/1983 | Hyltin | 315/205 |
| 4,412,156 | 10/1983 | Ota | 315/308 |
| 4,587,461 | 5/1986 | Hanlet | 315/DIG. 7 |
| 4,724,360 | 2/1988 | Luursema | 315/244 |
| 4,910,440 | 3/1990 | McMullin | 315/DIG. 7 |
| 4,972,124 | 11/1990 | Powers | 315/DIG. 7 |
| 5,030,887 | 7/1991 | Guisinger | 315/DIG. 7 |
| 5,068,570 | 11/1991 | Oda et al. | 315/128 |
| 5,140,229 | 8/1992 | Yagi et al. | 315/307 |
| 5,151,631 | 9/1992 | Oda et al. | 315/127 |
| 5,212,428 | 5/1993 | Sasaki et al. | 315/308 |

FOREIGN PATENT DOCUMENTS

| 3614708 | 11/1987 | Germany. | |
| 3623306 | 11/1988 | Germany. | |
| 4134537 | 4/1992 | Germany. | |
| 53-85976 | 7/1978 | Japan | 315/209 R |
| 9203898 | 3/1992 | WIPO | 315/DIG. 7 |

OTHER PUBLICATIONS

C. H. Sturm, E. Klein, "Betriebsgerate und Schaltunyen fur elektrische lampen," 6th ed., 1992, siemens AG, pp. 217–218.

Primary Examiner—Robert J. Pascal
Assistant Examiner—Michael Shingleton
Attorney, Agent, or Firm—Sughrue, Mion, Zinn, Macpeak & Seas

[57] ABSTRACT

Disclosed is a lighting circuit for a discharge lamp, which employs a rectangular-wave based lighting system and is designed to prevent lighting failure from frequently occurring in the discharge lamp immediately after the lighting of the discharge lamp starts or at the end of the lamp's life. In the lighting circuit, a battery voltage is boosted by a DC booster circuit and is then converted to a rectangular-wave voltage by a DC/AC converter. This rectangular-wave voltage is then applied via an inductor of an igniter circuit to a metal halide lamp. The DC booster circuit has a chopper type structure and has a smoothing capacitor at the output stage. A resonance controller comprising a diode and a resonance capacitor is located between the DC booster circuit and the DC/AC converter. The DC/AC converter has a bridge structure having field effect transistors (FETs). The two pairs of FETs are reciprocally switched from one pair to the other by a drive controller. The diode of the resonance controller serves to cut off the current path to block the coupling of the inductor to the smoothing capacitor of the DC booster circuit and couple the resonance capacitor to the inductor, when the polarity of the rectangular-wave voltage is inverted.

23 Claims, 10 Drawing Sheets

LIGHTING CIRCUIT FOR VEHICULAR DISCHARGE LAMP

BACKGROUND OF THE INVENTION

FIELD OF THE INVENTION

The present invention generally relates to a lighting circuit for a discharge lamp, which employs a rectangular-wave based lighting system, and, more particularly, to a novel lighting circuit for a vehicular discharge lamp, which is designed to prevent lighting failure from frequently occurring in a discharge lamp immediately after the lighting of the discharge lamp or at the end of the lamp's life.

DESCRIPTION OF THE RELATED ART

Compact metal halide lamps have recently been receiving greater attention as a light source that can replace an incandescent lamp. A known lighting circuit for a vehicular metal halide lamp uses a DC power source, boosts the DC input voltage by a booster circuit, and then converts the boosted voltage into an AC voltage of a rectangular waveform by a DC/AC (Direct Current to Alternate Current) converter before applying the voltage to the metal halide lamp.

Figure 9:
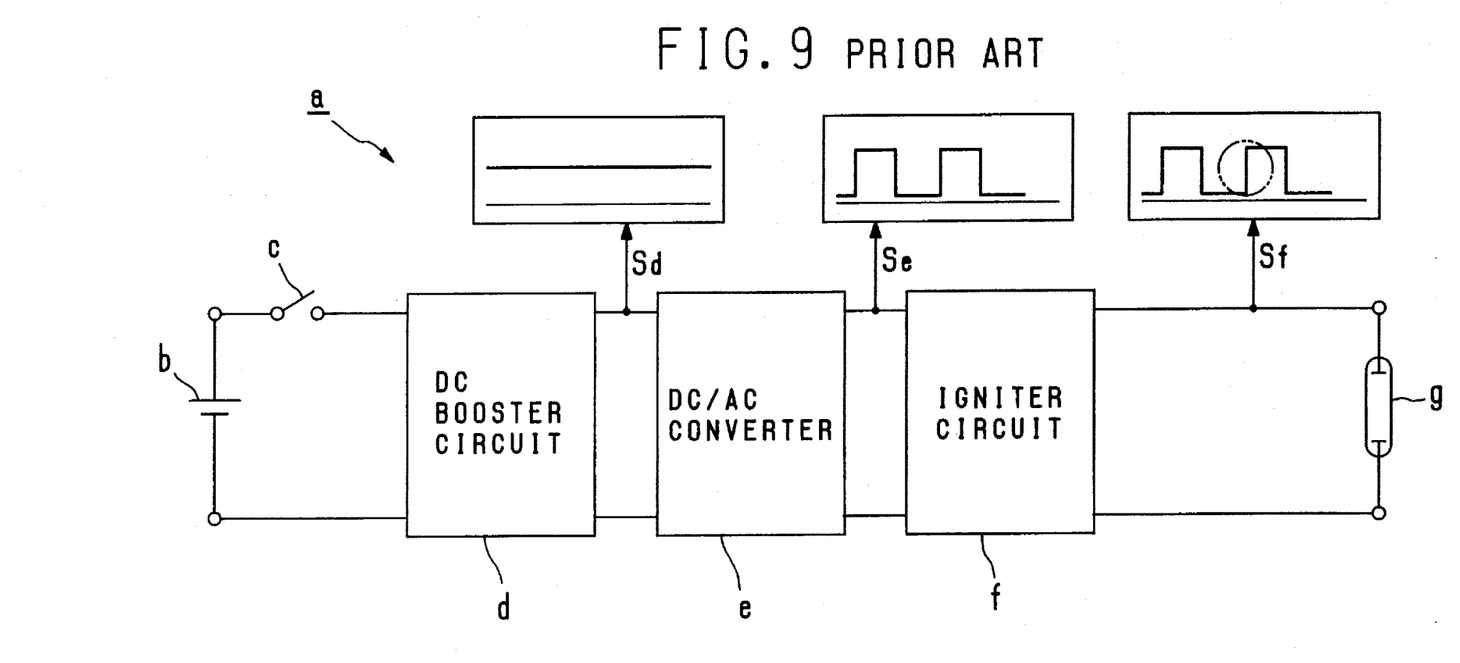
FIG. 9 is a circuit block diagram showing the structure of a conventional lighting circuit.

FIG. 9 shows conventional of a lighting circuit. The lighting circuit a has a battery b connected via a lighting switch c to a DC booster circuit d whose output is subsequently converted to an AC signal by a DC/AC converter e. The AC output of the DC/AC converter e is supplied via an igniter circuit f to a metal halide lamp g.

In the diagram, reference symbols "sd", "se" and "sf" schematically represent the output of the DC booster circuit d, the output of the DC/AC converter e and a voltage to be applied to the metal halide lamp g, respectively. The voltages se and sf have rectangular waveforms.

At the time the metal halide lamp g is lit by an AC voltage, a re-ignition voltage is generated when the polarity of the rectangular-wave voltage is inverted. If an insufficient voltage is supplied to the metal halide lamp g at this time, lighting failure of the lamp is likely to occur for the following reason.

When the lamp is lit by a rectangular-wave voltage, the output voltage of the DC booster circuit d becomes equal to the lamp voltage of the metal halide lamp g. If a re-ignition voltage above the saddle voltage of the lamp g is generated, sufficient power will not be supplied to the lamp g from the DC booster circuit d.

Figure 10A:
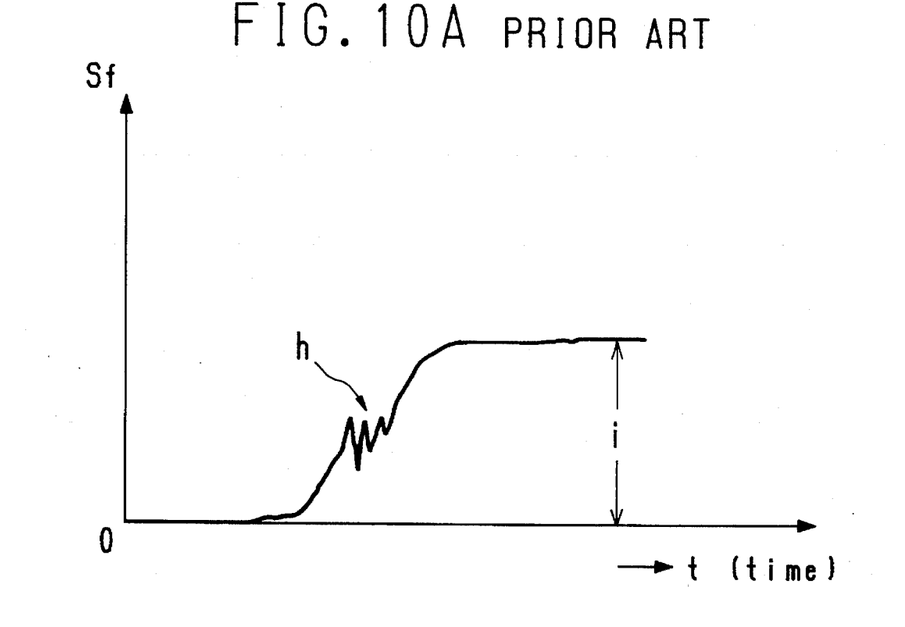
Figure 10B:
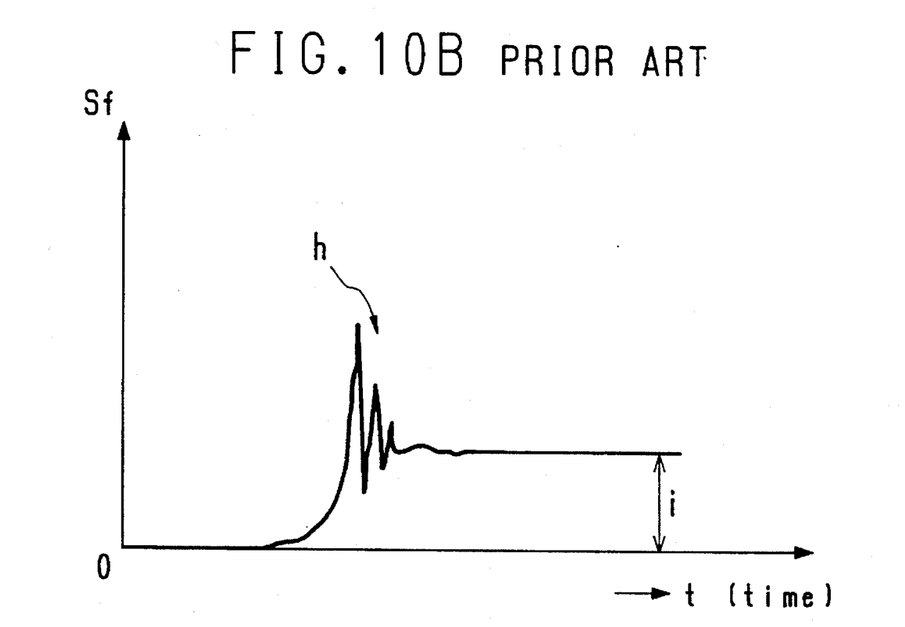

FIGS. 10A and 10B present waveform diagrams schematically showing this situation, by illustrating in an enlargement of the rising waveforms of the rectangular-wave voltage sf (i.e. the circled portion in FIG. 9). FIG. 10A shows the waveform at the normal time, and FIG. 10B shows the waveform when the lamp is lit from a cold state or when the lamp is lit near the end of its life. In the diagrams, h indicates the re-ignition voltage and i indicates the saddle voltage.

It is apparent from the diagrams that the peak value of the re-ignition voltage h rises above the saddle voltage i in the situation in FIG. 10B while the peak value of the re-ignition voltage h does not exceed the saddle voltage i in the situation in FIG. 10A.

SUMMARY OF THE INVENTION

Accordingly, it is an object of the present invention to provide an improved lighting circuit for a vehicular discharge lamp, which can overcome the above shortcoming.

To achieve this object, according to one aspect of the present invention, there is provided a lighting circuit for a vehicular discharge lamp, which comprises a DC power supply circuit section including a smoothing capacitor; a bridge type DC/AC converter; an inductance element provided at a subsequent stage of the DC/AC converter; a discharge lamp connected in series to the inductance element for accomplishing rectangular-wave based lighting; and a resonance control section, provided between the DC power supply circuit section and the DC/AC converter at a subsequent stage thereof and including a resonance capacitor and cutoff means for cutting off supply of a sustaining current, induced by the inductance element when the polarity of a rectangular wave is inverted, to the smoothing capacitor of the DC power supply circuit section, thereby allowing the inductance element to be coupled to the resonance capacitor.

To achieve the above object, according to another aspect of the present invention, there is provided a lighting circuit for a vehicular discharge lamp, which comprises a DC power supply circuit section including a smoothing capacitor; a bridge type DC/AC converter; an first inductance element provided at a subsequent stage of the DC/AC converter; a discharge lamp connected in series to the first inductance element for accomplishing rectangular-wave based lighting; and a resonance control section, provided between the DC power supply circuit section and the DC/AC converter at a subsequent stage thereof wherein said resonance control section comprises a resonance capacitor and a second inductance element connected to each other in such a manner that a resonance voltage is generated during said predetermined period.

According to the first aspect of this invention, the peak value of the resonance voltage, induced by the coupling of the inductance element to the resonance capacitor when the polarity of a rectangular wave is inverted, can be increased by setting the capacitance of the resonance capacitor to a small value, thus contributing to compensation for the re-ignition voltage. It is therefore possible to suppress the frequent occurrence of lighting failure of the discharge lamp immediately after the lighting of the discharge lamp starts or at the end of the lamp's life.

According to the second aspect of this invention, switching control is performed in such a manner as to provide a period (dead time) during which all the switching elements of the DC/AC converter are set off and during which resonance with a large peak value is caused by the coupling of the first inductance element to the resonance capacitor without involving the lamp resistance, thus contributing to compensation for the re-ignition voltage. It is therefore possible to suppress the frequent occurrence of lighting failure of the discharge lamp immediately after the lighting of the discharge lamp starts, or at the end of the lamp's life, or even at the time of the normal lighting of the discharge lamp.

BRIEF DESCRIPTION OF THE DRAWINGS

FIGS. 10A and 10B present schematic waveform diagrams for explaining the conventional problem, FIG. 10A showing the rising of a rectangular waveform at the normal time while FIG. 10B shows the rising of a rectangular waveform when lighting failure occurs.

DETAILED DESCRIPTION OF THE PREFERRED EMBODIMENTS

A lighting circuit for a vehicular discharge lamp according to each illustrated embodiment of the present invention will now be described referring to the accompanying drawings.

Figure 1:
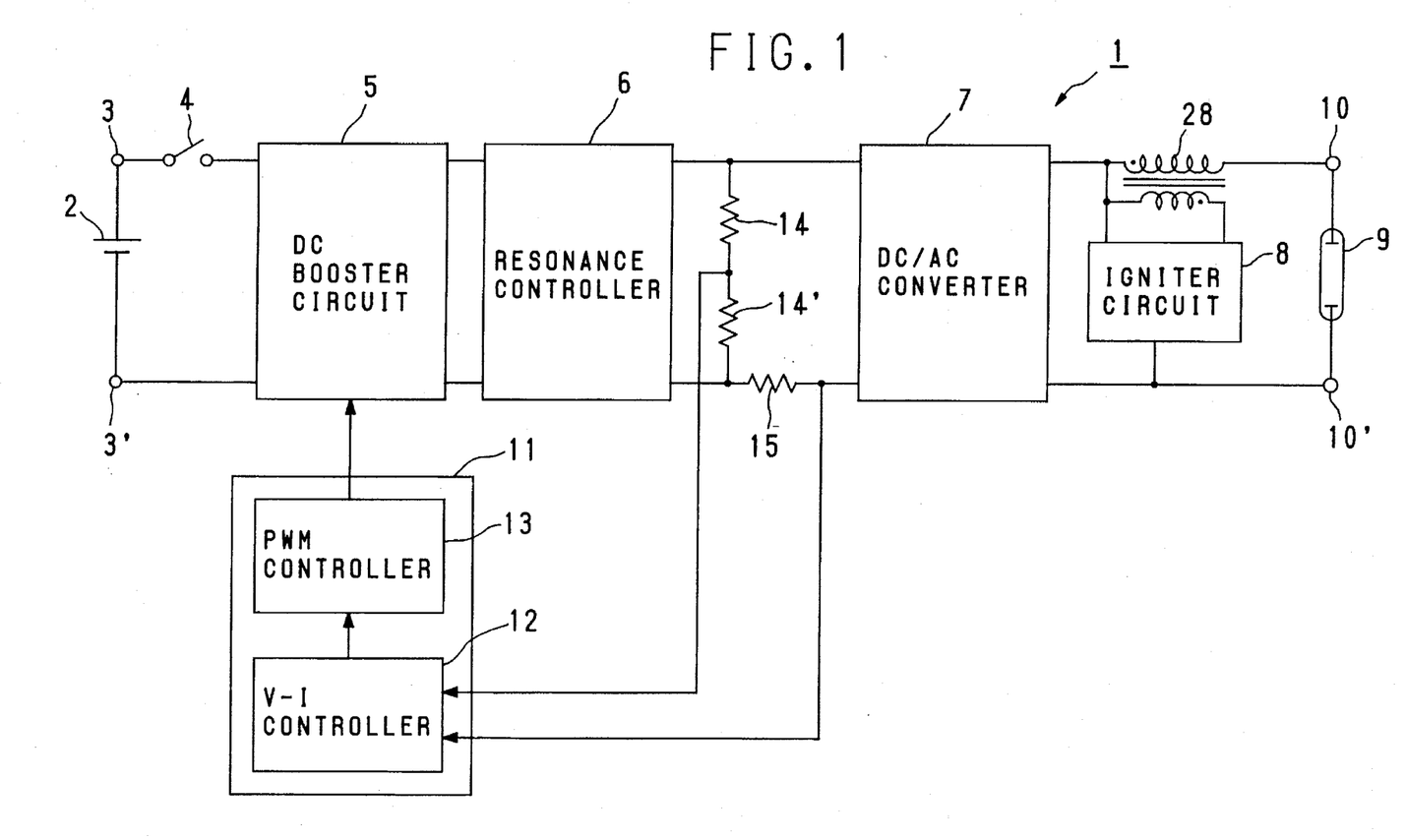
FIG. 1 is a circuit block diagram illustrating the structure of a lighting circuit for a vehicular discharge lamp according to a first embodiment of the present invention.

FIG. 1 presents a circuit block diagram showing the general structure of a lighting circuit 1 according to the first embodiment of this invention.

The lighting circuit 1 has a battery 2 as a DC power supply, a lighting switch 4, a DC booster circuit 5, a resonance controller 6, a DC/AC converter 7, an igniter circuit 8, and a control circuit 11.

The battery 2 is connected between DC voltage input terminals 3 and 3'. The lighting switch 4 is provided on a positive line which connects the positive terminal of the DC booster circuit 5 and the DC voltage input terminal 3. The DC voltage input terminal 3 is connected to the positive terminal of the battery 2.

The resonance controller 6 is connected to of the DC booster circuit 5, and increases the peak value of the voltage at resonance when a rectangular wave is inverted to compensate for the re-ignition voltage of the lamp.

The DC/AC converter 7 is provided to convert the DC output voltage of the DC booster circuit 5 into an AC voltage of a rectangular waveform.

At the time a metal halide lamp 9 is activated, the igniter circuit 8 generates a trigger pulse, superimposes this trigger pulse on the AC output of the DC/AC converter 7, and applies the resultant signal to the metal halide lamp 9 connected between AC output terminals 10 and 10'.

The control circuit 11, which serves to control the output voltage of the DC booster circuit 5, includes a V (voltage)-I (current) controller 12 and a PWM (Pulse Width Modulation) controller 13.

The V-I controller 12 is designed to perform lighting control of the metal halide lamp 9 based on a control curve which defines the relationship between the lamp voltage and lamp current. The V-I controller 12 uses a load line, which is a linear approximation of a given power curve in the normal state. Although the lamp voltage and lamp current are directly detectable, detection signals equivalent to the signals of the lamp voltage and current are obtained indirectly and used in this embodiment.

More specifically, the V-I controller 12 receives a voltage detection signal corresponding to the output voltage of the DC booster circuit 5, which is detected by voltage-dividing resistors 14 and 14' provided between the output terminals of the DC booster circuit 5.

The V-I controller 12 also receives a current detection signal corresponding to the output current of the DC booster circuit 5, in the form of a voltage which is converted by a current detecting resistor 15 provided on the ground line that connects the DC booster circuit 5 to the DC/AC converter 7.

An instruction signal output from the V-I controller 12 is sent to the PWM controller 13, and a control signal produced by the PWM controller 13 is fed back to the DC booster circuit 5.

Figure 2:
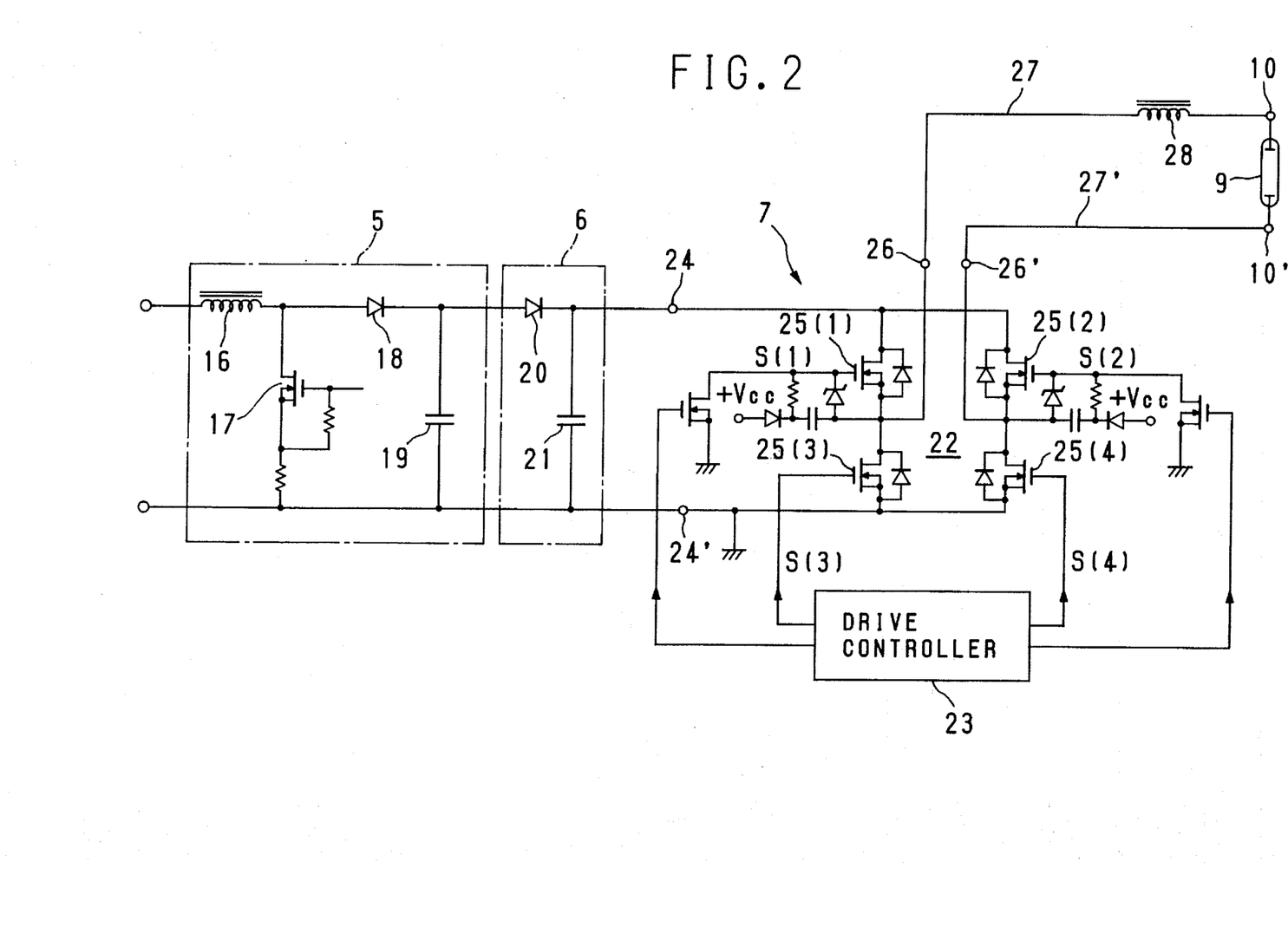
FIG. 2 is a circuit diagram showing the essential portions of the lighting circuit for a vehicular discharge lamp according to the first embodiment of this invention.

FIG. 2 illustrates the circuit structure of the essential portions of the lighting circuit 1 in detail.

As illustrated, the DC booster circuit 5 has a structure of a chopper type, DC-to-DC converter and comprises an inductor 16 connected to a positive line, an N channel FET (Field Effect Transistor) 17, provided between the positive line and a ground line, a rectifying diode 18 having its anode connected to the drain of the FET 17 on the positive line, and a smoothing capacitor 19 provided between the cathode of the diode 18 and the ground line. The FET 17 performs its switching operation in response to the control pulse sent from the PWM controller 13.

When the FET 17 is turned on by the control pulse from the PWM controller 13, the inductor 16 accumulates energy. When the FET 17 is turned off, the inductor 16 discharges the accumulated energy and a voltage equivalent to this energy is superimposed on the input voltage to accomplish the DC boosting.

The resonance controller 6 increases the peak value of the voltage resonance when the polarity of the output of the DC/AC converter 7 changes.

The resonance controller 6 comprises a diode 20 and a capacitor 21, and the cathode of the diode 20 is connected to the ground line via the capacitor 21. The terminal voltage of the capacitor 21 is sent to the DC/AC inverter 7. The capacitance of the capacitor 21, which will be denoted by "C21", is selected to be smaller than the capacitance of the smoothing capacitor 19 located at the output stage of the DC booster circuit 5. The DC/AC converter 7 comprises a bridge type driver 22 having four N channel FETs and a drive controller 23, which sends a switching control signal to those FETs.

Reference numeral "24" is a positive input terminal and reference numeral "24'" a ground input terminal.

Of the four N channel FETs 25(i) (i=1, 2, 3, 4) constituting the bridge type driver 22, the FETs 25(1) and 25(3) are connected in series, and the FETs 25(2) and 25(4) are connected in series. The two pairs of series-connected FETs are arranged in parallel to each other.

With regard to the first FET pair 25(1) and 25(3), the upper FET 25(1) has its drain connected to the positive input terminal 24 and its source connected to the drain of the lower FET 25(3). The source of the lower FET 25(3) is connected to the ground input terminal 24'.

With regard to the second FET pair 25(2) and 25(4), the upper FET 25(2) has its drain connected to the positive input terminal 24 and its source connected to the drain of the lower FET 25(4) the source of the lower FET 25(3) is connected to the ground input terminal 24'.

A Zener diode is inserted between the gate and source of each of the FETs 25(1) and 25(2), and a capacitor and a resistor are inserted between the anode of the Zener diode and the gate of the associated FET. A predetermined voltage +Vcc (which is produced by a reference voltage generator, not shown) is applied via a diode to the node between the inserted capacitor and resistor.

An inductor 28 is provided on a line 27, connecting an output terminal 26 and the AC output terminal 10. The inductor 28 is equivalent to the secondary winding of a trigger transformer, which is provided in the igniter circuit 8 to produce a trigger pulse to the lamp 9. A line 27' connects an output terminal 26' and the AC output terminal 10'.

To control the switching of the FETs 25(i), the drive controller 23 sends control signals S(i) (i= 1, 2, 3, 4) to the individual FETs 25(i) directly or via different associated FETs in such a way that the pair of FETs 25(1) and 25(4) and the pair of FETs 25(2) and 25(3) are reciprocally controlled. Since the structure of the drive controller 23 does not directly relate to the subject matter of the present invention, however, its illustration and explanation will not be given here.

Figure 3:
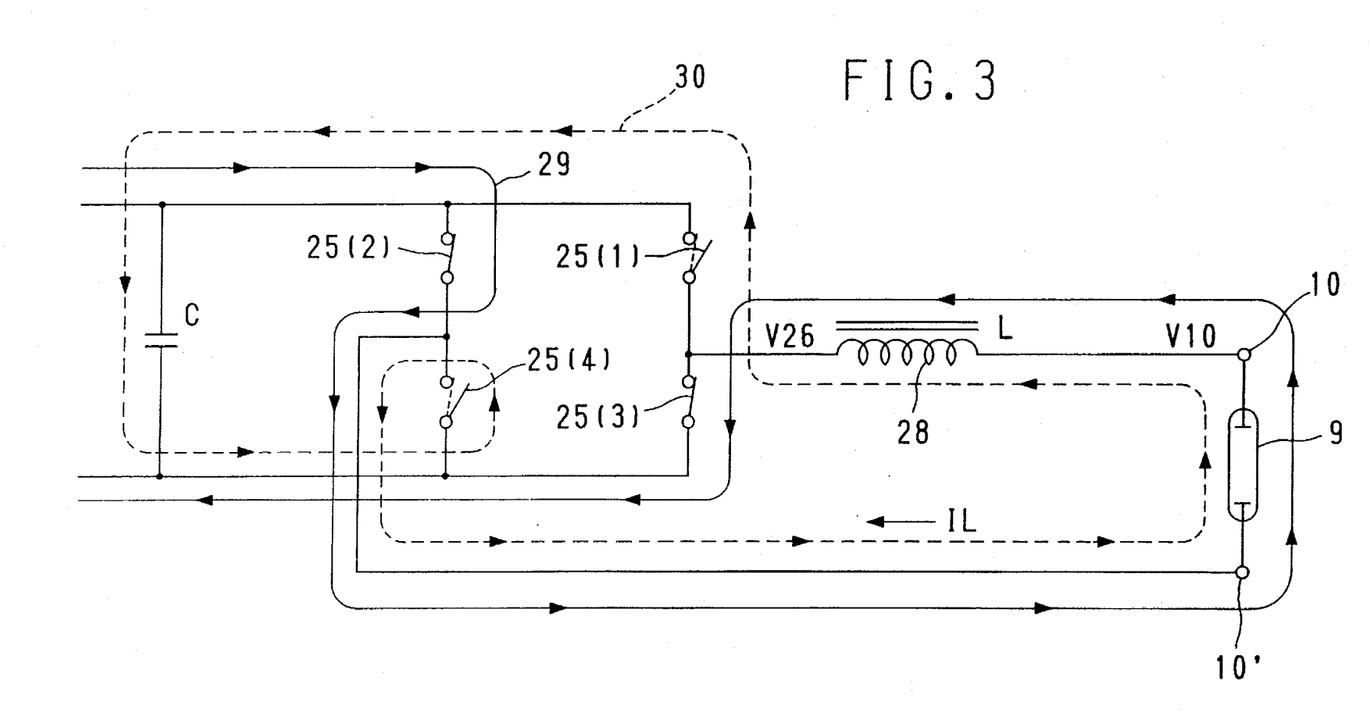
FIG. 3 is a diagram of an equivalent circuit of the circuit in FIG. 2, showing a change in current path at the rising of the positive-side output of a DC/AC converter.

FIG. 3 shows an equivalent circuit around the DC/AC converter 7 at the rising of the output on the line 27, and the FETs 25(i) are represented by switches symbols.

A path 29 indicated by the solid line in this diagram is a current path when the FETs 25(2) and 25(3) are set on, and a path 30 indicated by the broken line is a current path immediately after the FETs 25(2) and 25(3) are turned off and the FETs 25(1) and 25(4) are turned on.

Figure 4:
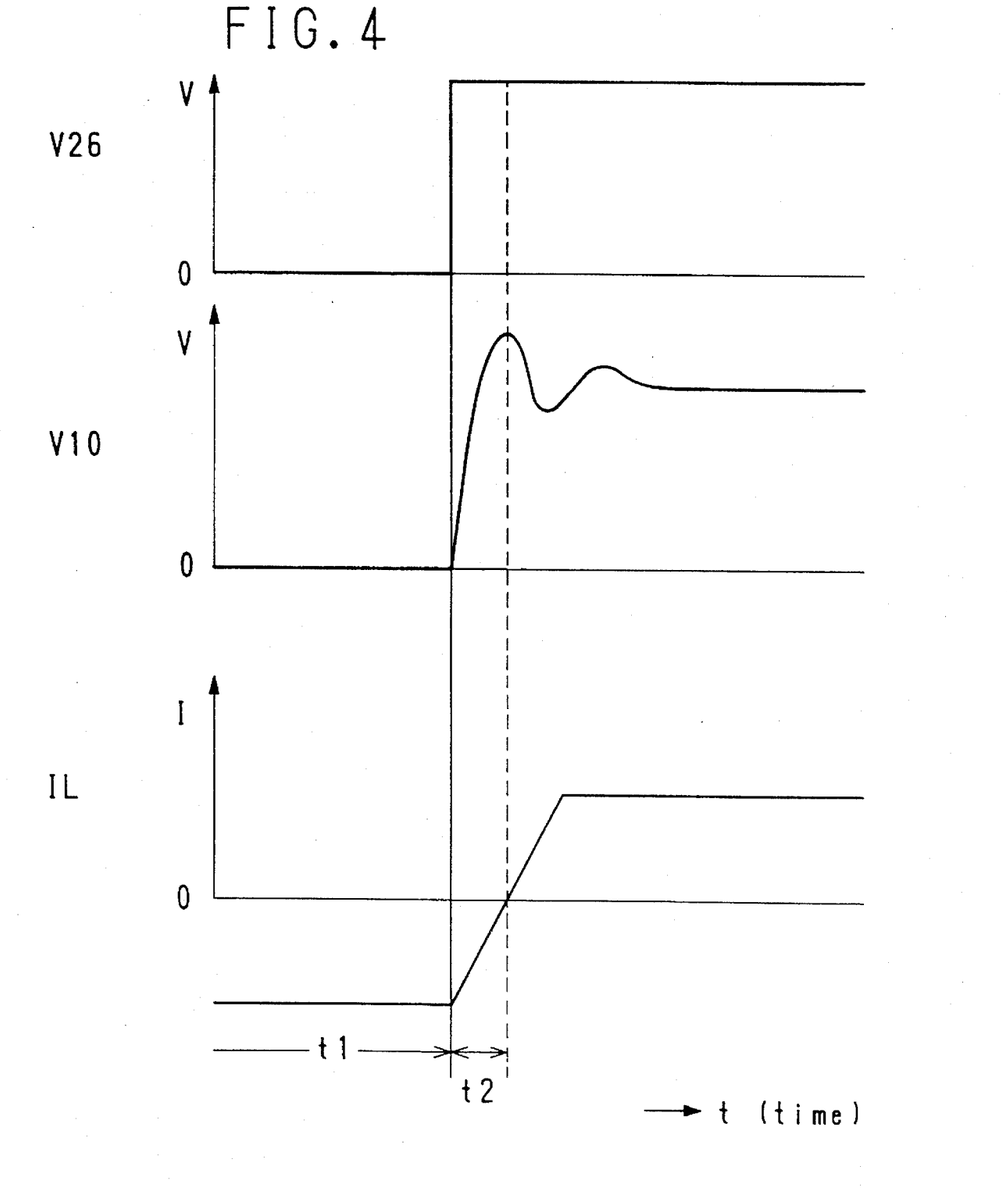
FIG. 4 is a diagram schematically showing the waveforms at the individual sections in FIG. 3.

FIG. 4 schematically shows the waveforms of the potential V26 of the output terminal 26, the potential V10 of the AC output terminal, 10 and the lamp current IL (which flows in the arrowhead direction) in FIG. 3. In FIG. 4, "t1" is a period during which the FETs 25(2) and 25(3) are on and the FETs 25(1) and 25(4) are off, and "t2" is a period from the point at which V26 rises to the peak point of V10.

Since the DC booster circuit 5 is located before the DC/AC converter 7, and since the inductor 28 and metal halide lamp 9 are connected in series after the DC/AC converter 7, LC resonance at which the peak value of the voltage occurs would be determined by the coupling of the inductance L of the inductor 28 and the capacitance C of the capacitor 19 if the resonance controller 6 located between the DC booster circuit 5 and the DC/AC converter 7 were not considered.

When the FETs 25(2) and 25(3) are turned off and the FETs 25(1) and 25(4) are turned on, the inductance L causes a current to flow in the direction the current has been flowing through the lamp 9 until that transition, but the current path changes from the path 29 to the path 30. That is, the path 29 is formed during the period t1 in FIG. 4 while the path 30 is formed during the period t2.

The resonance voltage after the current-path has switched will be applied to the metal halide lamp 9.

The lamp 9 in the normal lighting state can be considered as a pure resistance. When the lamp current IL decreases, however, the resistance of the lamp 9 increases accordingly and becomes infinity when IL=0.

If the value of the resonance voltage is not sufficiently high at this time, the peak value of the fluctuating waveform of the re-ignition voltage becomes greater than the saddle voltage i as shown in FIG. 10B. However, the present invention causes the value of the resonance voltage to be higher than the re-ignition voltage applied to the lamp 9. Accordingly the rectangular wave smoothly rises, thus preventing lighting failure of the lamp 9.

The larger the inductance L is and the smaller the capacitance C is, the larger the peak value of the voltage at resonance becomes. Further, the larger the lamp current before resonance is and the smaller the impedance of the lamp 9 is, the larger the peak value of the resonance voltage becomes. To increase the peak value of the voltage at resonance, the value of the inductance L could be increased and the capacitance C could be decreased within the limits permitted by the circuit design.

However, increasing of the inductance L will raise the a problem that the speed of switching the polarity of the rectangular wave becomes slower and the period during which the lamp current IL stays near zero becomes longer, thus increasing the re-ignition voltage.

Even with this restriction of the inductance L, the capacitance C cannot be made unreasonably small. With the resonance controller 6 unconsidered, the capacitance C equals the capacitance of the capacitor 19. Therefore, the capacitance must be of certain size to enable the DC booster circuit 5 to provide a stable DC output with a small ripple.

In this respect, the peak value of the voltage at resonance when the polarity of the rectangular wave is reversed can be increased by providing the resonance controller 6 at the output of the DC booster circuit 5 to allow the capacitor 21 to have a smaller capacitance than the capacitor 19. Accordingly, the resonance circuit enables the capacitor 21 to act as a resonance capacitor.

In other words, since the peak value of the voltage at resonance can be determined regardless of the capacitance of the capacitor 19 of the DC booster circuit 5, the capacitance C21 of the capacitor 21 can arbitrarily be set to a smaller value than the capacitance of the capacitor 19.

The diode 20 of the resonance controller 6 is provided to cut off the sustaining current induced by the inductance L from being applied to the capacitor 19 at the time the polarity of the rectangular wave is reversed. Therefore, diode 20 causes resonance to be determined by the coupling of the inductance L and the capacitance C21 of the capacitor 21.

It is to be noted that the fluctuating waveform of the re-ignition voltage h as shown in FIG. 10 and 10B will be buried in the waveform during the period t2.

Figure 5:
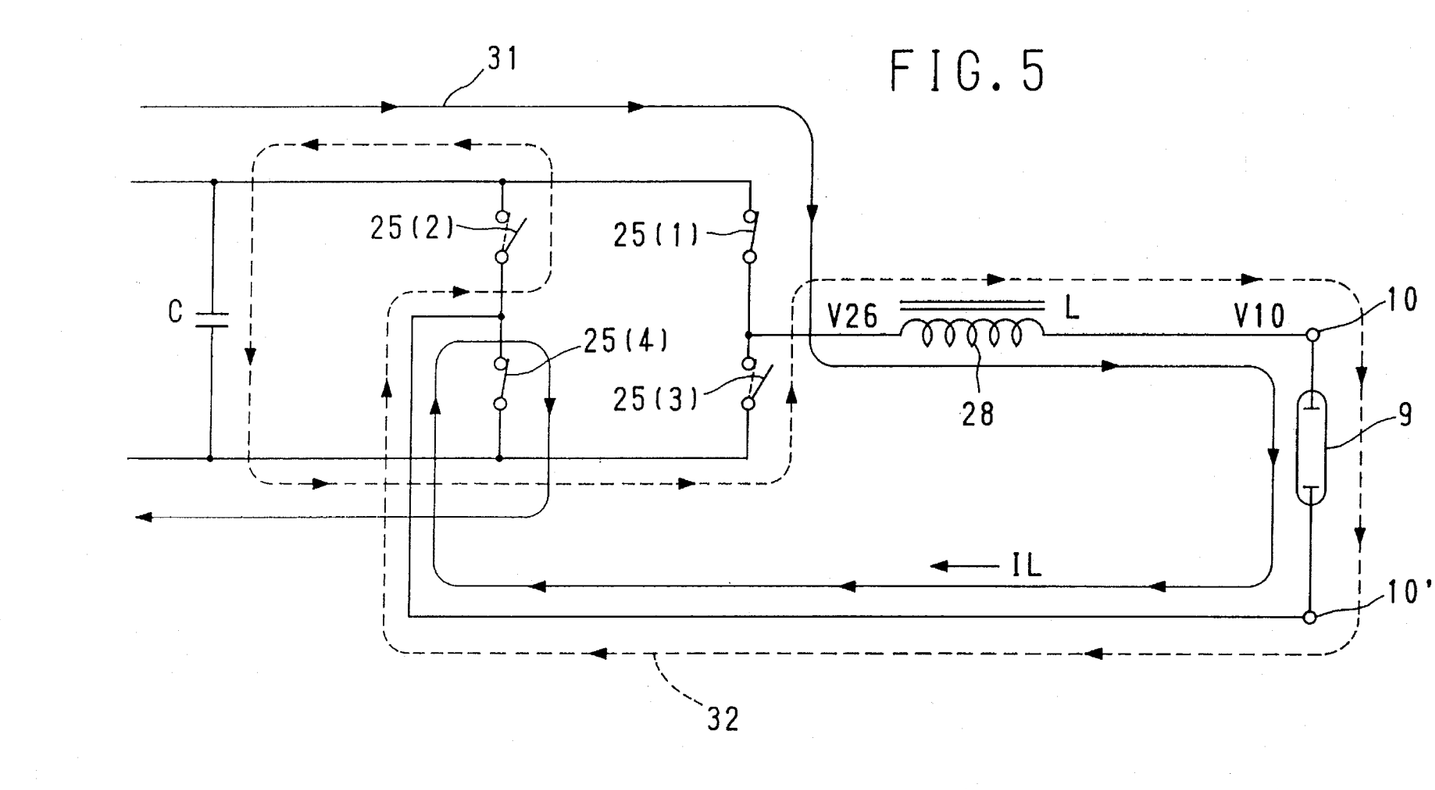
FIG. 5 is a diagram of an equivalent circuit of the circuit in FIG. 2, showing a change in current path at the falling of the positive-side output of the DC/AC converter.

FIG. 5 shows an equivalent circuit around the DC/AC converter 7 at the falling of the output on the line 27.

A path 31 indicated by the solid line in this diagram is a current path when the FETs 25(1) and 25(4) are set on, and a path 32 indicated by the broken line is a current path immediately after the FETs 25(1) and 25(4) are turned off and the FETs 25(2) and 25(3) are turned on.

Figure 6:
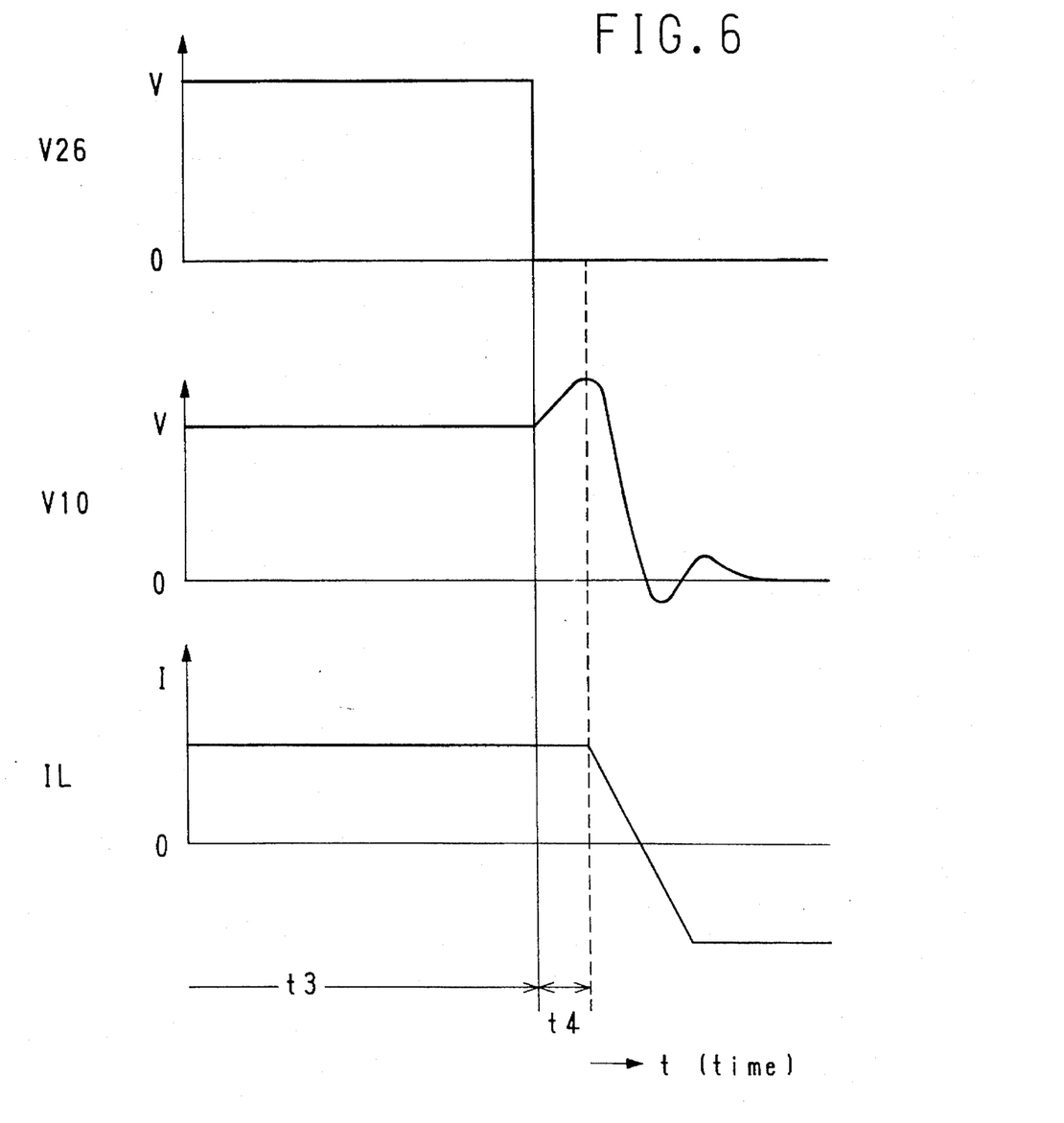
FIG. 6 is a diagram schematically showing the waveforms at the individual sections in FIG. 5.

FIG. 6 schematically shows the waveforms of the potential V26 of the output terminal 26, the potential V10 of the AC output terminal 10, and the lamp current IL (which flows in the arrowhead direction) in FIG. 5.

In FIG. 6, "t3" is a period during which the FETs 25(1) and 25(4) are on and the FETs 25(2) and 25(3) are off, and "t4" is a period from the point at which V26 falls to the peak point of V10.

When the FETs 25(1) and 25(4) are turned off and the FETs 25(2) and 25(3) are turned on, the inductance L causes a current to flow in the direction the current has been flowing until that transition, but the current path changes from the path 31 to the path 32 to the path 32 from the path 31. That is, the path 31 is formed during the period t3 in FIG. 6 while the path 32 is formed during the period t4. The resonance voltage after the current-path has switched will be applied to the metal halide lamp 9.

The peak value of the voltage at resonance occurs when the lamp current IL becomes zero (when the re-ignition voltage is generated). If this peak value is large, the inversion of the polarity of the rectangular wave will be carried out smoothly.

Because of the resonance controller 6 in the lighting circuit 1, as described earlier, the capacitance of the capacitor 21 can be set to a small value independently of the capacitance of the capacitor 19 of the DC booster circuit 5, so that the peak value of the voltage at resonance can be increased.

That is, the peak value of the voltage at resonance can be determined only by setting the capacitance of the capacitor 21 of the resonance controller 6 without modifying the structure of the DC booster circuit 5 and/or the structure of the DC/AC converter 7 at all.

Figure 7:
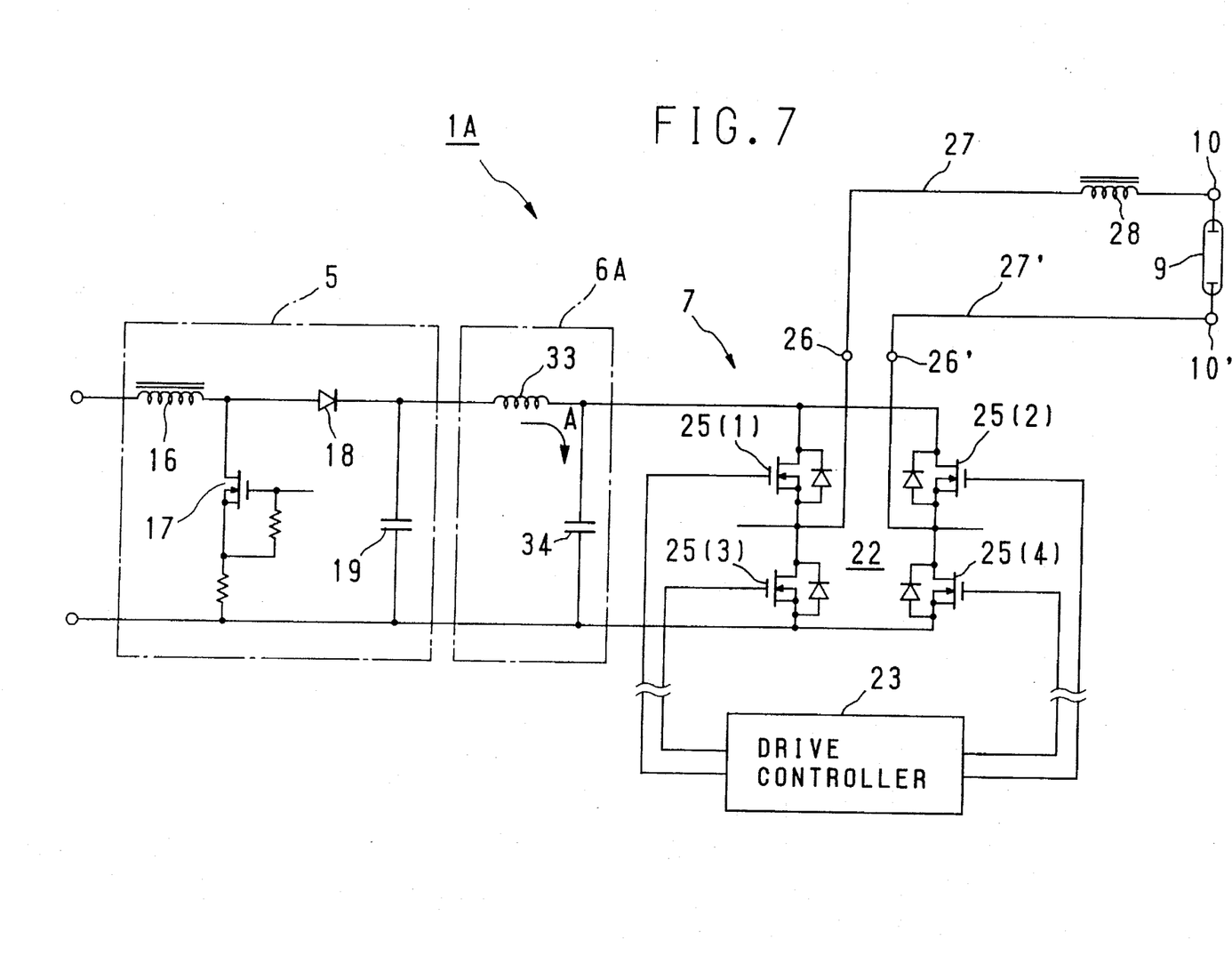
FIG. 7 is a circuit diagram showing the essential portions of a lighting circuit for a vehicular discharge lamp according to a second embodiment of this invention.

FIG. 7 illustrates the second embodiment 1A of this invention. A lighting circuit for a vehicular discharge lamp according to the second embodiment differs from that of the first embodiment only in the structure of the resonance controller. The other portions are the same as those of the first embodiment, and the same reference numerals as used for the first embodiment will also be used to denote identical or corresponding elements of the second embodiment in order to avoid repeating their description.

The resonance controller 6A located at the subsequent stage of the DC booster circuit 5 comprises an inductor 33 and a capacitor 34.

The inductor 33 is provided on the positive line connecting the DC booster circuit 5 to the DC/AC converter 7, and the capacitor 34 is inserted between the ground line connecting the DC booster circuit 5 to the DC/AC converter 7 and the rear end of the inductor 33. The capacitance of the capacitor 34, which is denoted by "C34", is designed to be smaller than the capacitance of the capacitor 19 at the output stage of the DC booster circuit 5.

To control the switching of the FETs 25(i) which constitute the bridge type driver 22, the drive controller 23 sends a control signal to the bridge type driver 22 in such a manner as to provide a dead time during which all the FETs 25(i) are turned off.

At the dead time, a current flowing in the bridge constituted by the FETs 25(i) becomes zero, and the charge current of the inductor 33 flows in the direction of the arrow A in FIG. 7. As a result, resonance occurs due to the coupling of the inductor 33 and the capacitor 34. If the capacitance C19 is much greater than the capacitor C34, the influence of the capacitor 19 on the resonance is negligible.

As this resonance voltage compensate for the re-ignition voltage of the lamp 9 and the resonance does not involve the resistance component of the lamp 9, the Q value is large (i.e., the resonance curve has a high sharpness).

As resonance is caused through the lamp in the first embodiment as shown in FIGS. 3 and 5, the Q value of the resonance is large at the initial stage of the lighting when the lamp resistance is small. When the lamp comes to the steady state, however, the lamp resistance increases, and the Q value decreases so that a peak voltage which is high enough to compensate for the re-ignition voltage may not be obtained in some case. In the second embodiment, a sufficient peak voltage to compensate for the re-ignition voltage will be obtained at the dead time irrespective of the lamp resistance after lighting.

It should however be noted that if a large lamp current is made to flow at the initial stage of the lighting to shorten the rising time of the flux of light of the lamp, the peak voltage at the initial lighting stage becomes too large as compared with the peak voltage in the steady lighting state of the lamp.

In other words, if the circuit constant of the resonance controller 6A is so set that the peak voltage in the steady lighting state becomes sufficient to compensate for the re-ignition voltage, the current flowing across the inductor 33 is large at the initial lighting stage, making the peak voltage too large. This increases a possibility that some elements of the FETs 25(i) constituting the bridge may be broken.

Figure 8:
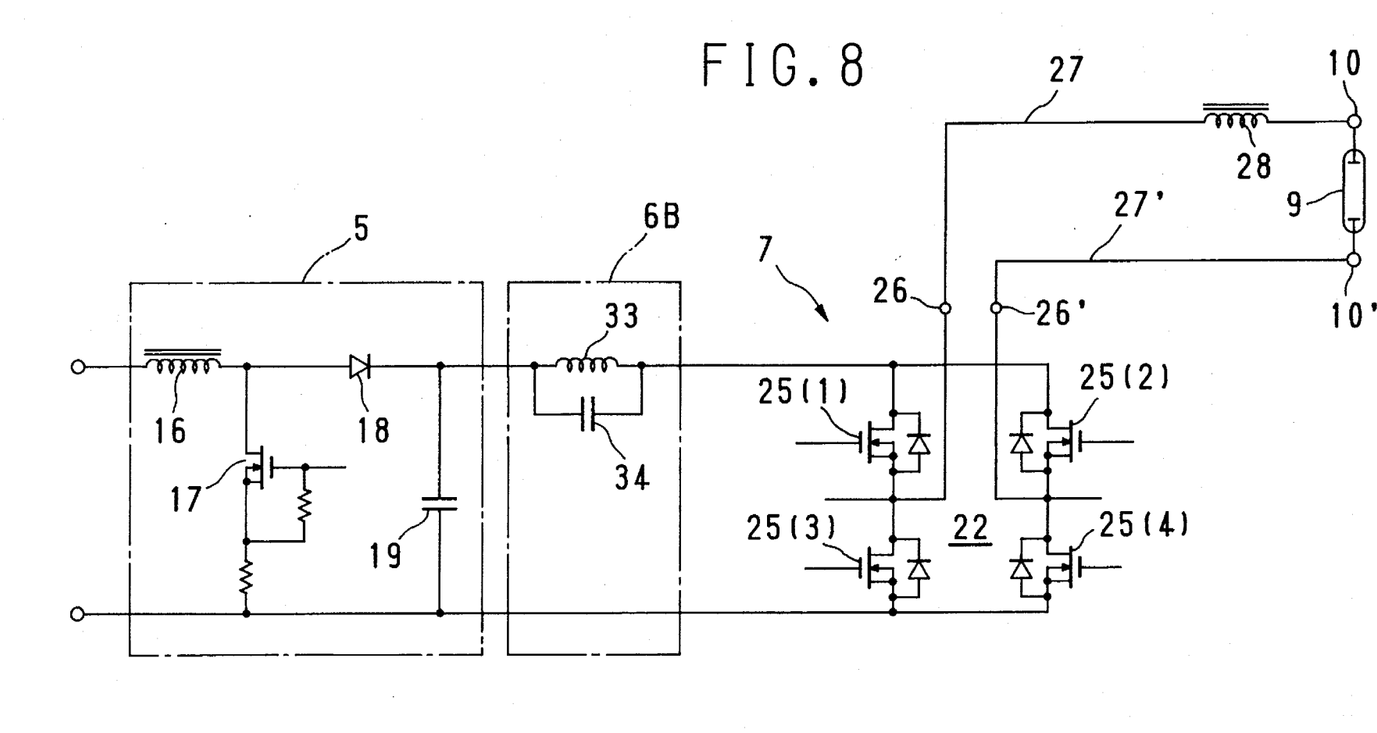
FIG. 8 is a circuit diagram showing the essential portions of a modification of the second embodiment of this invention.

There are various methods available to cope with this problem. For example, the inductor 33 may be saturated at the time a large lamp current flows across the inductor 33 at the initial lighting stage, thus preventing the peak voltage from becoming unnecessarily large. Alternatively, a Zener diode may be connected in parallel to the capacitor 34 to suppress the peak voltage so that it will not exceed the breakdown voltage of each FET. The structure of the resonance controller 6A is not limited to the one shown in FIG. 7, but may be modified as shown in FIG. 8 where a resonance controller 6B has the capacitor 34 connected in parallel to the inductor 33. The resonance controller may have any structure as long as the inductor 33 and the capacitor 34 are connected in parallel to each other as viewed toward the DC booster circuit 5 from the input stage of the bridge type driver 22.

In short, according to the first embodiment of this invention, the peak value of the voltage at resonance is induced by the coupling of the inductance element to the resonance capacitor when the polarity of a rectangular wave is inverted and can be increased by setting the capacitance of the resonance capacitor to a small value, thus contributing to compensation for the re-ignition voltage. It is therefore possible to suppress the frequent occurrence of lighting failure of the discharge lamp immediately after the lighting of the discharge lamp starts when the lamp is in the cold state or at the end of the lamp's life.

Since the peak value of the voltage at resonance can be set irrespective of the capacitance of the smoothing capacitor of the DC power supply circuit section, no significant modification of the circuit structure is necessary.

According to the second embodiment of this invention, the resonance controller, located between the DC power supply circuit section. The DC/AC converter, is constituted by an inductance element and a resonance capacitor. The inductance element and the resonance capacitor are connected in parallel to each other as viewed toward the DC power supply circuit section from the DC/AC converter, thereby providing a dead time in the switching control of the bridge that constitutes the DC/AC converter. During this dead time, a voltage which has a large peak value at resonance is caused without involving the lamp resistance to ensure compensation for the re-ignition voltage in the steady lighting stage of the discharge lamp as well as in the initial lighting stage thereof. It is therefore possible to improve the stability of the lighting of the discharge lamp and suppress the frequent occurrence of flickering or lighting failure of the discharge lamp.

Although only two embodiments of the present invention for a lighting circuit for a vehicular discharge lamp have been described herein, the present example and embodiments are to be considered as illustrative and not restrictive, and the invention is not to be limited to the details given herein, but may be modified within the scope of the appended claims. For instance, although the DC booster circuit 5 has been explained as the DC power supply circuit section in the individual embodiments, a DC booster/de-booster circuit or the like may be used as needed.

What is claimed is:

1. A lighting circuit for a vehicular discharge lamp, comprising:

a DC power supply circuit section including a smoothing capacitor;

a bridge type DC/AC converter;

an inductance element provided at a subsequent stage of said DC/AC converter;

a discharge lamp connected in series to said inductance element for accomplishing rectangular-wave based lighting; and a resonance control section, provided between said DC power supply circuit section and said DC/AC converter at a subsequent stage thereof and including a resonance capacitor and cutoff means for cutting off supply of a sustaining current, induced by said inductance element when the polarity of a rectangular wave is inverted, to said smoothing capacitor of said DC power supply circuit section, thereby allowing said inductance element to be coupled to said resonance capacitor, wherein the capacitance of said resonance capacitor is substantially less than the capacitance of said smoothing capacitor in order to maximize a resonance voltage applied to said discharge lamp while maintaining an output of said DC power supply circuit section smooth.

2. The lighting circuit according to claim 1, wherein said cutoff means is a diode connected to said resonance capacitor, wherein said diode has an anode connected to a positive output terminal of said DC power supply circuit section and a cathode connected to one end of said resonance capacitor, wherein an other end of said resonance capacitor is connected to a negative output terminal of said DC power supply circuit section, and wherein a terminal voltage of said resonance capacitor is supplied to said DC/AC converter.

3. The lighting circuit according to claim 1, wherein said DC power supply circuit section has a structure of a chopper type, DC-to-DC converter, and comprises an inductor connected to a positive line, an N channel field effect transistor (FET), provided between said positive line and a ground line at a subsequent stage of said inductor, a diode having an anode connected to a drain of said FET on said positive line, and a smoothing capacitor provided between a cathode of said diode and said ground line.

4. The lighting circuit according to claim 1, further comprising a control circuit for controlling an output voltage of said DC power supply circuit section.

5. The lighting circuit according to claim 4, wherein said control circuit includes a voltage-current controller and a pulse width modulation (PWM) controller.

6. The lighting circuit according to claim 5, wherein said voltage-current controller performs lighting control of said discharge lamp based on a control curve which defines a relationship between a lamp voltage and a lamp current.

7. The lighting circuit according to claim 6, wherein said voltage-current controller receives a voltage detection signal corresponding to said output voltage of said DC power supply circuit section, which is detected by voltage-dividing resistors provided between output terminals of said DC power supply circuit section, and also receives a current detection signal corresponding to an output current of said DC power supply circuit section, in a form of voltage converted by a current detecting resistor provided on said ground line that connects said DC power supply circuit section to said DC/AC converter.

8. The lighting circuit according to claim 5, wherein said voltage-current controller produces an instruction signal to said PWM controller and said PWM controller produces a control signal and sends said control signal to said DC power supply circuit section.

9. The lighting circuit according to claim 1, wherein said DC/AC converter comprises a bridge type driver having four N channel FETs and a drive controller for sending a switching control signal to said FETs.

10. The lighting circuit according to claim 9, wherein two of said four FETs are connected in series, and the other two FETs are connected in series, and said two pairs of series-connected FETs are arranged in parallel to each other in such a way that the upper FET of one of said two pairs of FETs has a drain connected to a positive input terminal and a source connected to a drain of the lower FET having a source connected to a ground input terminal, and the upper FET of the other pair of FETs has a drain connected to said positive input terminal and a source connected to a drain of the lower FET having a source connected to said ground input terminal.

11. The lighting circuit according to claim 10, wherein a Zener diode is inserted between a gate and source of each of said upper FETs, with a capacitor and a resistor inserted between an anode of said Zener diode and said gate of the associated FET, whereby a predetermined voltage is applied via a diode to a node between said inserted capacitor and resistor.

12. A lighting circuit for a vehicular discharge lamp, having a DC power supply circuit section comprising:

a smoothing capacitor;

a bridge type DC/AC converter, wherein said DC/AC converter comprises switching elements and all of said switching elements are set off during a predetermined period;

a first inductance element provided at a subsequent stage of said DC/AC converter;

a discharge lamp connected in series to said first inductance element for accomplishing rectangular-wave based lighting; and a resonance control section provided between said DC power supply circuit section and said DC/AC converter, wherein said resonance control section comprises a resonance capacitor and a second inductance element connected to each other in such a manner that a resonance voltage is generated during said predetermined period.

13. The lighting circuit according to claim 12, wherein said second inductance element is provided on a positive line connecting said DC power supply circuit section to said DC/AC converter, and said capacitor is inserted between a ground line, connecting said DC power supply circuit section to said DC/AC converter, and a rear end of said second inductance element, said capacitor having a capacitance set smaller than that of said smoothing capacitor at an output stage of said DC power supply circuit section.

14. The lighting circuit according to claim 12, wherein said DC power supply circuit section has a structure of a chopper type, DC-to-DC converter, and comprises an inductor connected to a positive line, an N channel FET, provided between said positive line and a ground line at a subsequent stage of said inductor, a diode having an anode connected to a drain of said FET on said positive line, and a smoothing capacitor provided between a cathode of said diode and said ground line.

15. The lighting circuit according to claim 12, further comprising a control circuit for controlling an output voltage of said DC power supply circuit section.

16. The lighting circuit according to claim 15, wherein said control circuit includes a voltage-current controller and a PWM controller.

17. The lighting circuit according to claim 16, wherein said voltage-current controller performs lighting control of said discharge lamp based on a control curve which defines a relationship between a lamp voltage and a lamp current.

18. The lighting circuit according to claim 17, wherein said voltage-current controller receives a voltage detection signal corresponding to said output voltage of said DC power supply circuit section, which is detected by voltage-dividing resistors provided between output terminals of said DC power supply circuit section, and also receives a current detection signal corresponding to an output current of said DC power supply circuit section, in a form of voltage converted by a current detecting resistor provided on said ground line that connects said DC power supply circuit section to said DC/AC converter.

19. The lighting circuit according to claim 16, wherein said voltage-current controller produces an instruction signal to said PWM controller and said PWM controller produces a control signal and sends said control signal to said DC power supply circuit section.

20. The lighting circuit according to claim 12, wherein said DC/AC converter comprises a bridge type driver having four N channel FETs and a drive controller for sending a switching control signal to said FETs.

21. The lighting circuit according to claim 20, wherein two of said four FETs are connected in series, and the other two FETs are connected in series, and said two pairs of series-connected FETs are arranged in parallel to each other in such a way that the upper FET of one of said two pairs of FETs has a drain connected to a positive input terminal and a source connected to a drain of the lower FET having a source connected to a ground input terminal, and the upper FET of the other pair of FETs has a drain connected to said positive input terminal and a source connected to a drain of the lower FET having a source connected to said ground input terminal.

22. The lighting circuit according to claim 21, wherein a Zener diode is inserted between a gate and source of each of said upper FETs, with a capacitor and a resistor inserted between an anode of said Zener diode and said gate of the associated FET, whereby a predetermined voltage is applied via a diode to a node between said inserted capacitor and resistor.

23. The lighting circuit according to claim 12, wherein said second inductance element is provided on a positive line connecting said DC power supply circuit section to said DC/AC converter and said resonance capacitor is provided on said positive line and is connected in parallel with said second inductance element.

* * * * *